Patented July 2, 1929.

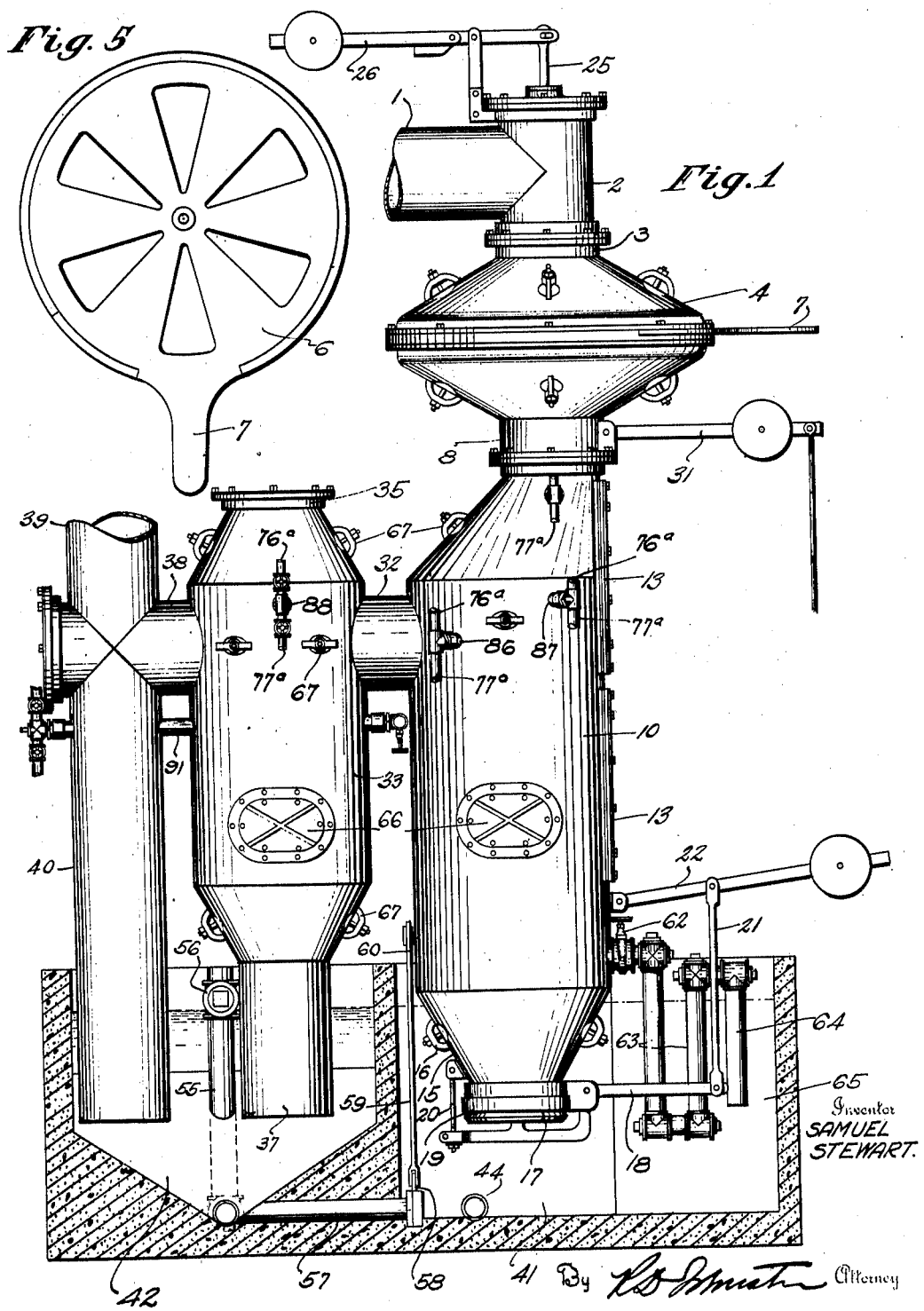
July 2, 1929.  S. STEWART  1,718,988
GAS WASHER
Filed April 25, 1925   5 Sheets-Sheet 1
Inventor
SAMUEL STEWART.

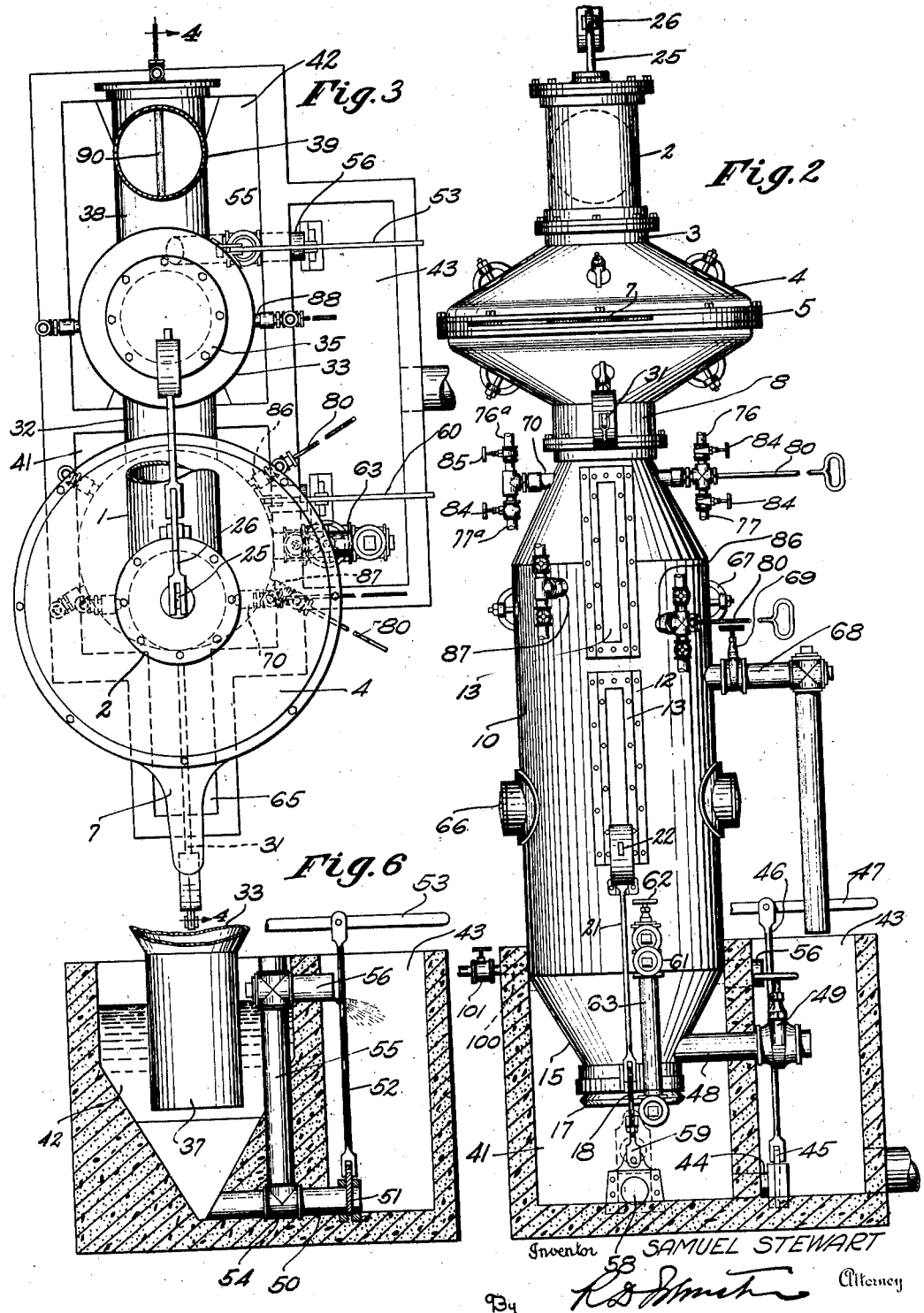

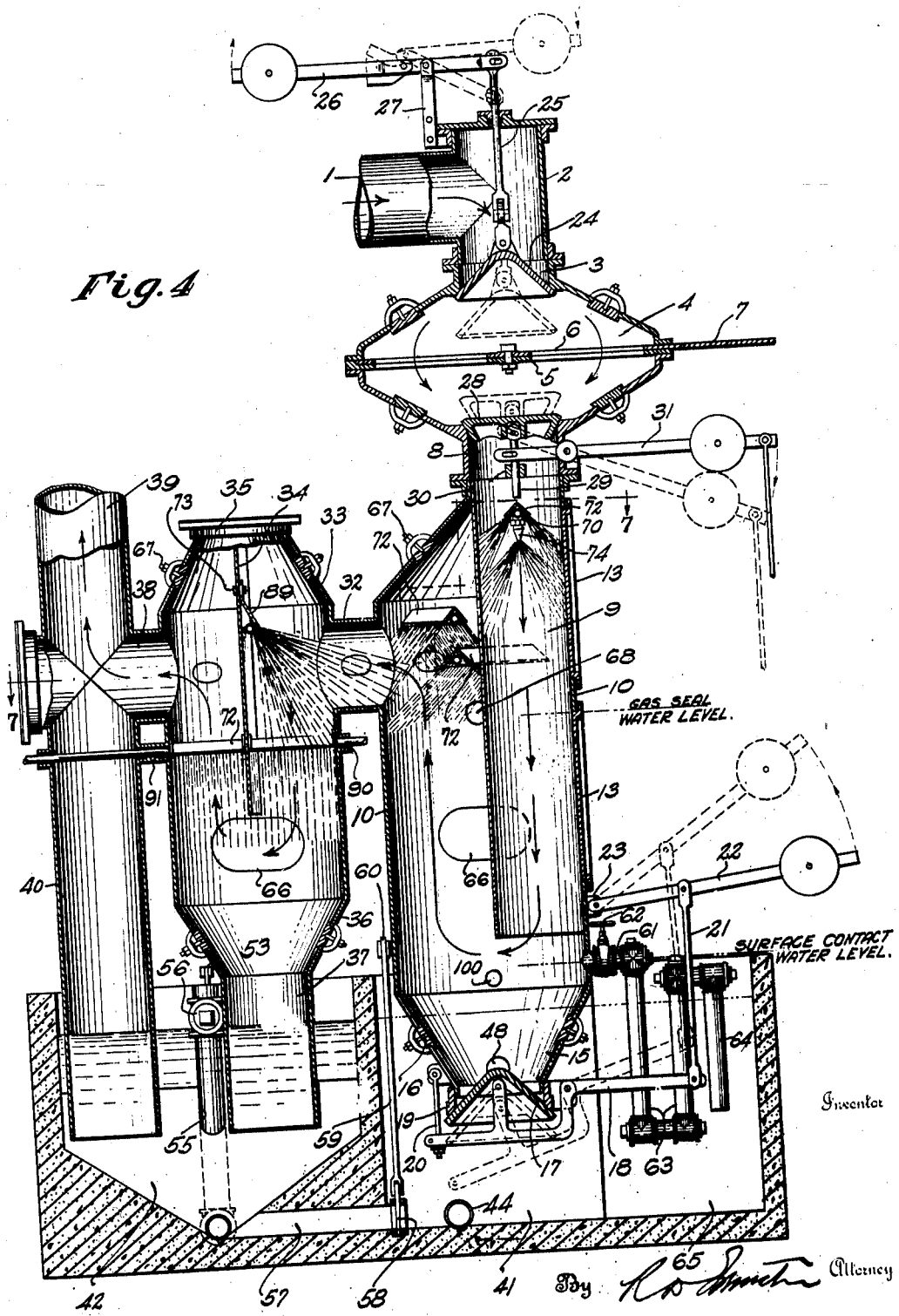

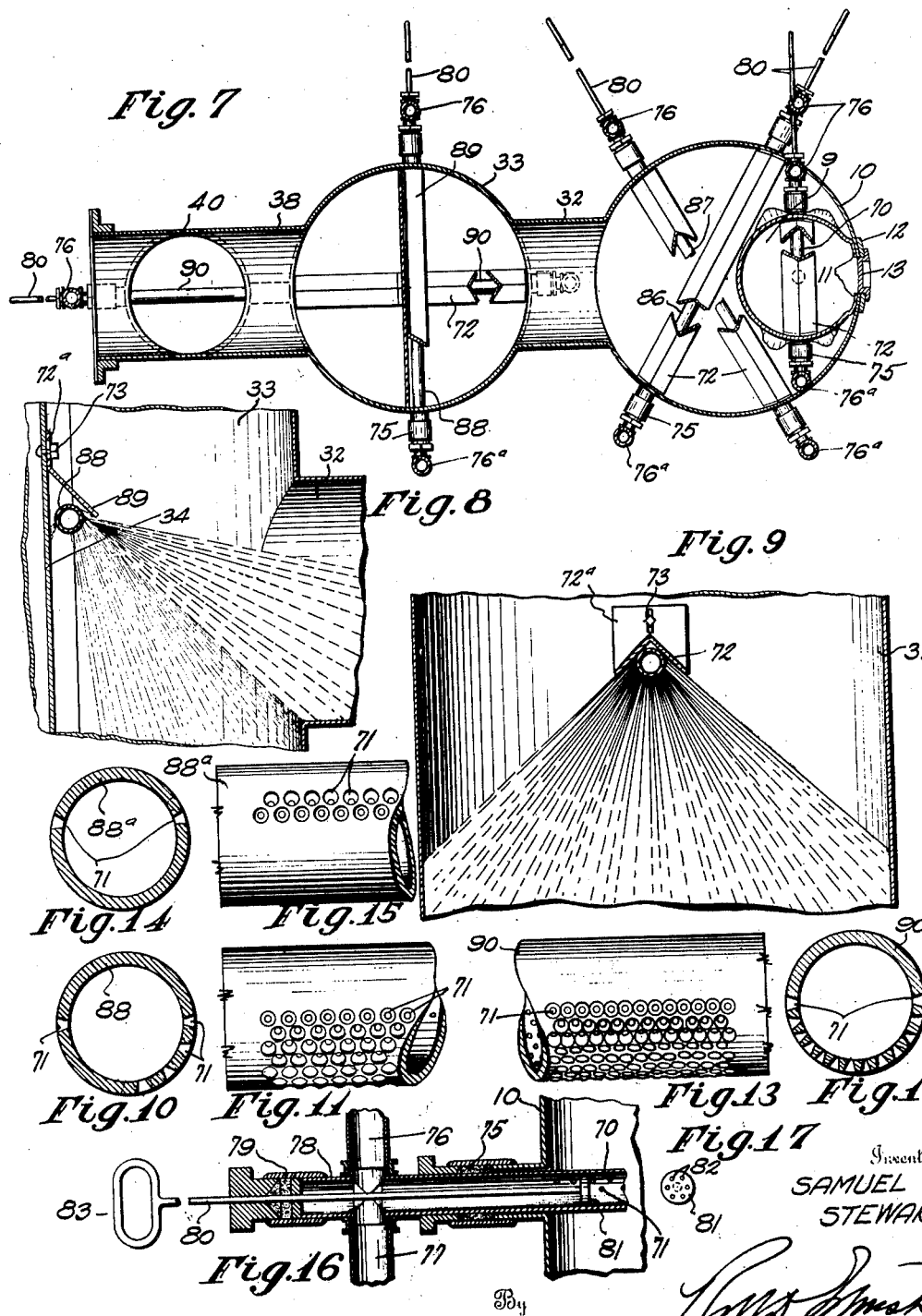

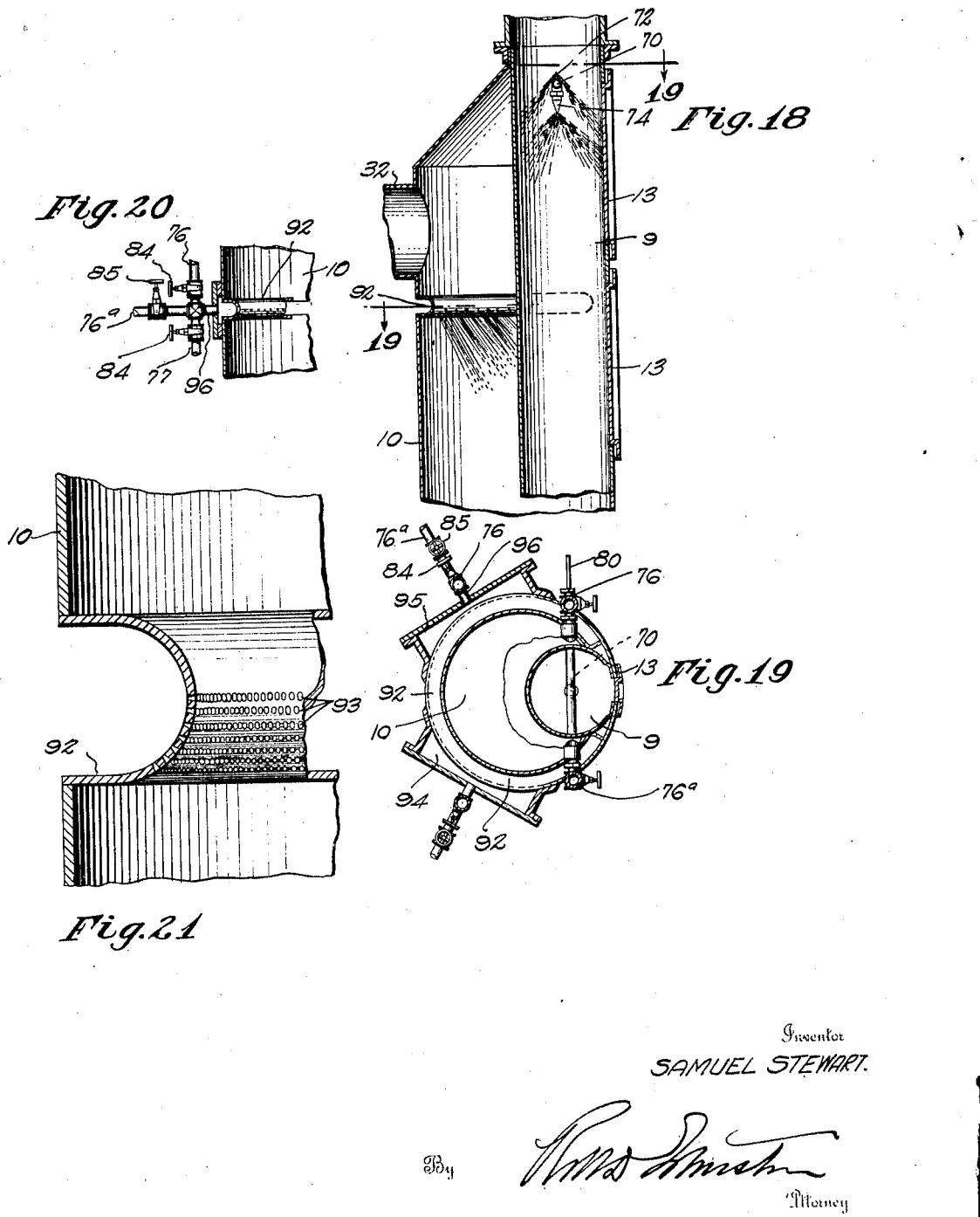

1,718,988

UNITED STATES PATENT OFFICE.

SAMUEL STEWART, OF BIRMINGHAM, ALABAMA.

GAS WASHER.

Application filed April 25, 1925. Serial No. 25,950.

My invention relates to a mechanism for removing from blast furnace and other gases particles of foreign matter in suspension therein.

The chief object of my invention is to design an apparatus which can be readily converted for use as a surface contact washer, a concurrent flow washer, a counter-current flow washer, a concurrent and counter-current flow washer, a dry dust catcher and washer, a dry dust catcher, and a water seal for the gas main, all these changes in function being obtained simply in a comparatively inexpensive mechanism so that I can adapt the appliance for almost any dust collecting service that may be required of it. Moreover, this adaptability gives the important advantage of enabling the apparatus, when installed for one service, to be changed from one to another service until its most efficient operation results.

More particularly, my invention contemplates the provision of means to pass the gases with a reverse flow, first downwardly and then upwardly, through cleaning chambers containing sprays which are arranged and designed to produce therein a dense spray zone through which all the gas must pass and which will act to moisten all of the dust particles. The sprays, being independently controllable, may be used to give the concurrent or the counter-current, or the combined concurrent and counter-current cleaning action. Moreover, by lowering the water lever in the cleaner below the lower level of the inlet chamber, all the sprays can be stopped and surface contact cleaning will result.

My invention further contemplates the provision of a water sealed overflow for the mechanism when functioning as a surface contact washer.

A further object of my invention is to provide over the sprays adjustable baffles adapted to concentrate and direct the water flow and to atomize it, so as to give a more dense upper spray zone across the cleaning chamber. These baffles also are adapted to perform the important function of protecting the spray pipes from the accumulation of foreign matter thereon.

My invention further contemplates adapting the sprays for angular adjustment relative to the baffle to regulate the angle of the atomized spray thrown off therefrom across the cleaner.

My invention further comprises the use of a secondary cleaner having a connection with the upper part of the outflow chamber of the primary cleaner, and to keep this connection clean I provide a spray arranged to operate through the connection preferably with counter-current flow to the gas.

In order to protect the cleaner casing from the building up action of the solids I so design the sprays as to produce over all walls within the cleaning section of the casing a constantly flowing film of water which effectively prevents any accumulation of solids on said walls and provides a curtain through which the gas must pass in its flow from chamber to chamber.

My invention further contemplates designing the casing of the cleaner for most ready accessibility to the internal mechanism.

My invention further contemplates using steam or compressed air with the water to more effectively atomize it or to clean the interior of the spray pipe.

My invention further contemplates designing the sludge tank below the cleaner as a hopper which will concentrate all sludge at the intake of an overflow having a normally sealed bottom discharge for the sludge.

My invention further contemplates the novel details of construction and arrangements of parts, which are more fully illustrated in the accompanying drawings which form a part of this specification, and in which:—

Fig. 1 is a side elevation of my improved cleaner mechanism.

Fig. 2 is an end elevation; and

Fig. 3 is a plan view of Fig. 1.

Fig. 4 is a vertical transverse cross-section taken on the line 4—4 of Fig. 3.

Fig. 5 is a detail view of a rotary cut-off valve interposed in a gas main head of the cleaner.

Fig. 6 is a detail view of the hopper sludge with its overflow and clean out mechanism.

Fig. 7 is a horizontal cross-sectional view taken on the line 7—7 of Fig. 4 with the baffles partly broken away.

Fig. 8 is an enlarged sectional detail of the baffle and upper spray pipe on the intake side of the secondary washer.

Fig. 9 is an enlarged detail of the center spray in the secondary washer.

Figs. 10 and 11 respectively, illustrate in cross-section and fragmentally in elevation the spray pipe shown in Fig. 8.

Figs. 12 and 13 correspondingly illustrate the spray pipe shown in Fig. 9.

Figs. 14 and 15 illustrate in corresponding manner a modified type of spray for Fig. 8.

Fig. 16 illustrates external steam and water connections and the mechanical clean out for a spray.

Fig. 17 is an end view of the clean out plunger for a spray pipe.

Fig. 18 is a modified type of spray for the primary cleaner shown with the outer closure for the spray water box omitted.

Fig. 19 is a cross-sectional view of Fig. 18 taken on the line 19—19.

Fig. 20 is a detail of the water box for the side spray in Fig. 18.

Fig. 21 is an enlarged detail view of the water box showing the arrangement of spray holes therein.

Similar reference numerals refer to similar parts throughout the drawings.

In the embodiment of my invention illustrated, I have shown it adapted for the cleaning of blast furnace gas which is delivered to the apparatus through a pipe 1 from the furnace downcomer or other source of dirty gas. This pipe 1 enters a vertical pipe 2 which is connected to the intake connection 3 of a valve chamber 4 which is of much larger diameter than the pipe 3 and has a transverse multiported seat 5 over which a multiported rotatable slide valve 6 works, the valve having a handle 7 which projects without the side of the casing to enable it to be manipulated. From the valve chamber the gas flows through an outlet connection 8, and enters an initial treatment or inlet chamber 9 of the primary cleaner, which is generally designated by the numeral 10. This initial chamber is preferably formed within the cleaner 10 by a vertical wall consisting of a sheet of metal bent in circular form but having side portions 11 out-turned and secured to the inner wall of the outer cylindrical casing of the cleaner chamber 10. By this arrangement frames 12 can be applied to the outer casing between the portions 11 of the inner wall and can have their sides connected through the outer casing to the edges 11 of the inner casing, the frames being provided with elongated holes closed by handhole coverings 13, as shown in Figs. 4 and 7. The removal of these handhole coverings thus gives access from without to the initial cleaning chamber 9, notwithstanding that it is arranged internally of the main casing 10. The casing 10 terminates at its bottom in a hopper 15 having handholes 16 and a bottom sealing bell 17 controlled by a hinged lever 18 pivotally connected to the bell seat 19 and extended across so as to receive a bolt 20 which will serve to positively hold the valve in closed position. The free end of the lever 18 is connected by a link 21 to a weighted arm 22 pivotally connected to lugs 23 on the casing 10. The weight thus serves to hold the bell in closed position and the arm affords accessible means for manually operating the bell. I provide an upwardly seating bell 24 controlled by a stem 25 and a counterweighted lever 26 mounted on a bracket 27 on the top of the pipe 2, the bell acting to open downwardly into the valve chamber 4 and when closed to seal the pipe 2. I provide a lower bell 28 having a stem 29 working in suitable guides 30 in the outlet 8 by means of which it may be opened or closed, the bell seating downwardly to seal the outlet connection 8 of the gas chamber.

The upper portion of the casing 10 is connected by an outlet 32 to the cylindrical casing of a secondary cleaner 33, which is provided with a transverse vertical baffle 34 extending from the top 35 thereof substantially below the connection 32. The bottom of the casing 33 is contracted at 36 and terminates in a discharge pipe 37. The casing 33 on the opposite side of its baffle from the inlet 32 is connected by an outlet 38 with a discharge pipe 39. This pipe has a bottom extension 40 dropping to the level of the end 37 of the secondary cleaner.

The apparatus as thus described is mounted on a suitable concrete foundation providing a water seal sludge chamber 41 into which the primary cleaner discharges and a hopper bottom sludge chamber 42 into which the secondary cleaner and pipe 40 discharge and are water sealed. An overflow sludge tank 43 is provided alongside the chambers 41 and 42. The chamber 41 has a bottom sludge outlet 44 opening into the bottom of sludge tank 43 and normally closed by a slide valve 45 operable by a rod 46 and a handle 47 above the tank. I also provide a sludge discharge into tank 43 from the hopper bottom 15 of the primary cleaner 10 by means of a pipe 48 controlled by a valve 49. The hoppered sludge chamber 42 has a sludge discharge pipe 50 entering the bottom of the tank 43 and controlled by a slide valve 51 operable by a rod 52 and handle 53. This discharge pipe 50 has connected therewith, by a T-fitting 54, a vertical overflow pipe 55 which has a discharge 56 entering the upper portion of the tank 43. I also form in the concrete hopper bottom of the chamber 42 a sludge outlet 57 entering the bottom of the sludge chamber 41 and controlled by a slide valve 58 operable by a rod 59 and handle 60.

I provide a water sealed overflow for the cleaner 10, when used as a surface washer, which consists of a pipe 61 controlled by a valve 62 and connected to an assembled U-pipe 63 which has its outer leg in communication with a downturned discharge pipe 64 arranged in an extension 65 of the sludge chamber 41. The casings 10 and 33 are provided at the desired points with manholes 66 and handholes 67.

In the mechanism, as thus far described, it is obvious that the gas can be caused to flow from the valve chamber downwardly through the chamber 9 and with a reverse whirl upwardly and at a reduced velocity through the enlarged chamber 10 and thence downwardly and upwardly through the secondary cleaner and out through the discharge 39. It is also obvious that such a mechanism will operate as a dry dust catcher in the primary cleaner by closing the bell 17 on the hopper 15 and drawing the water from the washer 10 through pipe 48. Under such conditions the gas, by reason of its velocity being materially reduced as it flows from the chamber 9 through the chamber 10, will throw off most of the heavier foreign matter in suspense therein and pass into the secondary cleaner which will be water sealed at the bottom. Any foreign matter thrown off from the gas in the secondary cleaner will pass off through pipe 37 into the sludge chamber 42, and be disposed of as hereinafter described. To further clean the dry gas in cleaner 33 the spray mechanism hereinafter described may be used in such cleaner 33. To convert the apparatus to function as a surface contact washer, water is admitted through pipe 100 under control of a valve 101 and to overflow through pipe 61 which has its valve 62 opened so that the water will be discharged through the pipes 63 and 64 into the sludge chamber 41 and escape through pipe 44 after valve 45 is opened. This provides a water surface against which the gas will impinge in its flow from chamber 9 to chamber 10 and the foreign matter collected on the water surface will pass off with the water through the sealed overflow while the heavier particles will settle on the bell 17 and be periodically discharged.

Should it be desired to water seal the gas main, I provide an overflow pipe 68 controlled by a normally closed valve 69 and adapted to discharge into tank 43. By filling the primary cleaner 10 to the level of pipe 68 with water I form an effective water seal to stop the flow of the gas.

The spray means for the initial cleaning chamber 9 is best understood by reference to Figs. 4 and 7 and comprise a transverse spray pipe 70 having a plurality of staggered rows of outlet ports 71 along each side thereof equidistant from a vertical central plane through the pipe and disposed to direct jets of water against the sides of an inverted V-shaped deflector 72 which is adjustably mounted diametrically across the chamber 9 above the pipe. The baffle is adjustable by means of flanges 72ª, each with a vertically elongated slot and having an attaching bolt 73, as shown in Figs. 8 and 9. The spray pipe 70 disposed in the vertical center of the chamber 9 is provided with a downturned spray nozzle 74. The pipe 70 passes out through a stuffing box 75 at each end through which it projects and on its outer end as a three-way fitting having one leg connected to a water supply pipe 76, another leg connected to a water blow off pipe 77, these pipes being connected at right angles to the axis of the pipe 70, see Fig. 16. A nipple 78 in line with the pipe 70 extends beyond the steam and water connections and carries a packing gland 79 through which the operating rod 80 of a clean out plunger 81 passes. The plunger is provided with a plurality of apertures 82 therein, as shown more clearly in Fig. 17, and at its operating end its rod has a handle 83. The rod is long enough for the plunger to be pushed back and forth through pipe 70 and through the gland 75 into nipple 78 at the remote end thereof, which end has connections 76ª for steam and 77ª for water. Valves 84 are provided on the water connections and a valve 85 on the steam connection.

For the sprays on the outer main chamber 10 I provide two transverse spray pipes 86 and 87 disposed at different levels in the upper part and lying in planes intersecting as near the center of the cleaning chamber as will be permitted by the walls of the initial eccentrically disposed vertical cleaning chamber 9. These pipes have mounted above them their respective inverted V-shaped baffles 72, this reference numeral being applied indiscriminately to all baffles which are alike in construction and operation.

In the secondary cleaner 33 I provide a transverse spray pipe 88 extending diametrically therethrough and lying on the side of the baffle 34 towards the inlet 32 and at or above the upper level of said inlet. This pipe 88 is covered by a baffle 89 attached to the baffle 34 and acting in conjunction with the former to direct a spray of water across the gases entering through the connection 32, as shown more clearly in Fig. 8. When operating the primary cleaner as a dry dust catcher or surface contact washer the baffle 89 is moved downwardly over the spray pipe 88 until the upper zone of the spray will strike below the connection 32, but for other uses the baffle is adjusted upwardly and the spray is caused to enter and keep the connection 32 clean. The spray pipe 88 preferably has the arrangement of parts shown in detail in Figs. 10 and 11. At right angles to this pipe 88 I provide a second spray pipe 90 which is covered by a baffle 72 and which extends also diametrically across the discharge pipe 40 passing through a connection 91 provided therefor and having a common plunger clean out and end water and steam connections as already described. It is to be understood that the water and steam connections both for inlet and discharge ends of the spray pipes described in connection with spray pipe 70, will be provided for the pipes 86, 87, 88 and 90, and I prefer to use the same arrangement of spray ports 71 for the several pipes 86, 87 and 90, such arrangement being either shown in Fig. 15 or Fig. 13. The pipe 88 is provided with the arrangement of nozzles shown in Figs. 10 and 11. It is obviously within the contemplation of my invention that these ports 71 may be arranged in different groups and at different positions according to the work desired, that shown being preferable for the functions which will now be pointed out. The spray pipes 86, 87 and 90 can be rotated in their stuffing boxes to produce a balanced spray on both sides, and the spray pipe 88 can be rotated to deflect the spray as desired in conjunction with its baffle plate 89.

In the operation of my apparatus as a dry dust catcher the several sprays in both the primary and secondary cleaners are cut off. If it is desired to convert the washer into a surface contact washer water is maintained in the bottom of the casing 10, and the valve 62 is opened so that water will overflow through the water sealed pipe connection shown into the sludge tank extension 65. Under such conditions the gases in passing from the chamber 9 to chamber 10 will have surface contact with the water in the bottom of the latter chamber and the dust collected by contact with the water as well as that falling into the water will flow off with the water or collect in the hopper 15 and can be discharged from time to time into the sludge chamber 41. When operating as a concurrent washer the spray pipe 70 and the jet 74 will be turned on, creating a dense spray zone extending across the chamber 9 and through which the gas and dust particles therein must pass. The zone thus created is deep enough and the spray particles are sufficiently fine to cause all dust particles to be moistened and thus more effectively thrown out in the chamber 10, it being noted that the sprays provide a water envelope that completely covers the walls of the chamber 9 throughout the gas treatment zone, so that no foreign matter will stick to them. If it be desired to add a counter-current washing action to the gases the sprays 86 and 87 are turned on and produce zones of spray particles through which the gases must pass in counter-current flow in rising to the outlet connection 32. These sprays also provide a water envelope to cover the walls of the chamber 104. If further washing is necessary either or both of the sprays 88 and 90 can be turned on, producing either concurrent and counter-current washing or both in the secondary cleaner 33.

In Figs. 18 to 21 I show a modification for the spray in the casing 10, which is here formed by a circumferential spray duct 92 set in the outer wall of the casing 10 and extending substantially about the same with its inner wall provided with rows of staggered perforations 93. The spray duct connects with water boxes 94 and 95 which enclose its open outer side and I connect to each water box a supply pipe 96 connecting with the water blow off pipe 77, the steam inlet pipe 76ª, and the water supply pipe 76.

When it is desired to seal the gas main the bell 17 is closed and the sprays are operated until the water level is raised in the casing 10 to the overflow 68, when it acts to water seal the cleaner chamber 9, which is often desirable and much more reliable than the use of valves in the gas main. The valve mechanism consisting of the bells 24 and 28 and the slide valve 6 will shut off the gas from the cleaner as effectively as can be done mechanically and the water seal may be used as an additional protection.

It is essential for obtaining the best results from my invention that each spray should be designed to interpose transversely across the gas passage, a flowing wall, sheet or zone of water of such character that there shall be no free opening for the gas to pass through it without bringing the suspended solids into intimate contact with the water. It follows from the utilization of a spray of this character that all the vertical walls below the uppermost spray zone will be continuously washed down by a film of flowing water which carries with it all of the solids and foreign matter collected by the water sprays from the gas through the pipe 15 and into the sludge tank.

Having thus described my invention, what I claim as new and desire to secure by Letters Patent, is:—

1. A blast furnace gas cleaner, comprising a cleaning chamber through which the gas flows, a transverse pipe intersecting the chamber and having on each side spray ports, a vertically adjustable inverted V-shaped spray deflecting plate mounted above said pipe throughout its traverse of the cleaning chamber to protect same from the deposition of solids, the said plate being movable into the path of the spray jets to break them up and direct them, as and for the purposes described.

2. In a blast furnace gas cleaner, an upright outer casing forming the main cleaning chamber, a vertical partition extending from the top part way downwardly through said chamber and defining in conjunction with part of the side wall of said outer casing an off-set initial cleaning chamber having an upper gas inlet and a bottom gas discharge into the main cleaner chamber, an outlet for the discharge of cleaned gas from said main cleaning chamber, there being hand holes giving access through the outer casing directly into the enclosed initial cleaner chamber, and means to seal the lower end of the main cleaning chamber.

3. A gas cleaner for blast furnace gas, comprising a casing having a hopper bottom with a sealed discharge for solid matter collecting therein, a vertical partition dividing the upper part of said casing into down and upflow chambers for the gas, water sprays in said chambers, a water supply, and valve controlled outlets at different levels to establish water levels in both chambers and below their connection, and valves controlling the sprays.

4. A cleaner for blast furnace gas comprising a casing having a sealed hopper bottom adapted for the collection and discharge of solids, a vertical wall in the upper part of said casing dividing it into down and upflow communicating chambers, gas inlet and outlet connections for said chambers, a valve controlled overflow substantially above the point of connection of said chambers, a valve controlled overflow substantially below the point of connection between said chambers, and means to admit water to said casing.

5. A gas cleaner comprising a casing having a partition to provide communicating downflow and upflow cleaning chambers, a hopper bottom for the casing having a sealing bell, a sediment chamber into which said hopper bottom discharges in position to be water sealed, and a valve controlled water-sealed, overflow pipe leading from the side of the casing adjacent to and below the partition therein.

6. A gas cleaner for blast furnace gas, comprising a cleaner casing having a partition to form downflow and upflow communicating chambers and having a hopper bottom with a sealing bell, a sediment chamber into which said bottom discharges in position to be water-sealed, a sludge tank adjacent to said chamber, a valve controlled discharge from the hopper above the bell leading into said sludge tank, and a valve controlled bottom port connecting said chamber and tank.

7. A gas cleaner according to claim 6, in combination with a valve controlled overflow leading from said casing below said partition and adapted to discharge into said sludge receptacle.

8. A gas cleaner, comprising a main cleaner casing having a sealed bottom discharge, and an off-center gas inlet in its upper portion, a vertical partition within said casing and disposed to form an eccentrically disposed initial cleaning chamber within the main casing registering with the gas inlet above.

9. A gas cleaner comprising a main casing having a vertical substantially circular partition eccentrically disposed therein to form an internal primary cleaning chamber, spray means in said primary chamber, a bottom seal for the main casing, and spray pipes intersecting said main casing only at different levels and at angles to each other, the said pipes being in substantially diametric position.

In testimony whereof I affix my signature.

SAMUEL STEWART.